US008869278B2

(12) United States Patent
Lahti et al.

(10) Patent No.: US 8,869,278 B2
(45) Date of Patent: *Oct. 21, 2014

(54) METHOD FOR DEFENDING AGAINST DENIAL-OF-SERVICE ATTACK ON THE IPV6 NEIGHBOR CACHE

(75) Inventors: Patrik Lahti, Ottawa (CA); Michael Aalders, Nepean (CA)

(73) Assignee: Bockstar Technologies LLC, Wilmington, DE (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/421,390

(22) Filed: Mar. 15, 2012

(65) Prior Publication Data
US 2012/0180130 A1 Jul. 12, 2012

Related U.S. Application Data

(63) Continuation of application No. 11/280,428, filed on Nov. 17, 2005, now Pat. No. 8,161,549.

(51) Int. Cl.
*G06F 11/00* (2006.01)
*H04L 29/06* (2006.01)
*H04L 12/861* (2013.01)

(52) U.S. Cl.
CPC ............ *H04L 49/90* (2013.01); *H04L 63/1458* (2013.01); *H04L 69/167* (2013.01)
USPC .......................................................... 726/23

(58) Field of Classification Search
USPC ................... 713/153, 154; 726/12, 13, 22–25
See application file for complete search history.

(56) References Cited

U.S. PATENT DOCUMENTS

| 7,656,840 | B2 | 2/2010 | Krishnamurthi et al. |
| 2003/0056094 | A1 | 3/2003 | Huitema et al. |
| 2003/0204742 | A1 | 10/2003 | Gupta et al. |
| 2005/0149829 | A1 | 7/2005 | Lee |
| 2007/0083638 | A1 | 4/2007 | Pinkerton et al. |

FOREIGN PATENT DOCUMENTS

| EP | 1189411 A2 | 3/2002 |
| WO | 03010548 A1 | 2/2003 |

OTHER PUBLICATIONS

S. Thomson, Request for Comments: 2462, IPv6 Stateless Address Autoconfiguration, Dec. 1998.*
Canadian Intellectual Property Office, "International Search Report" for corresponding PCT Patent Application No. PCT/CA2006/001585, dated Nov. 17, 2005, Canada.
Narten et al., Neighbor Discovery for IP Version 6 (IPv6), http://www.ietf.org/rfc/rfc2461.txt, dated Dec. 1998.

* cited by examiner

*Primary Examiner* — Brandon Hoffman
(74) *Attorney, Agent, or Firm* — Christopher & Weisberg, P.A.

(57) ABSTRACT

A method of defending against a denial-of-service (DoS) attack on an IPv6 neighbor cache includes steps of determining a number of neighbor cache entries currently stored in the neighbor cache and then determining whether the number of entries exceeds a neighbor cache threshold that is less than a neighbor cache limit defining a maximum capacity of the neighbor cache. When the number of entries in the neighbor cache exceeds the neighbor cache threshold, stateless neighbor resolution is triggered. Stateless neighbor resolution entails sending a neighbor solicitation to resolve an address for an incoming packet without logging a corresponding entry in the neighbor cache. Additional techniques that complement the above method involve purging of neighbor cache entries designated as incomplete, prioritization of the entries based on trustworthiness, shortening the incomplete-status timer to less than 3 seconds, and curtailing the number of retransmissions of the neighbor solicitations.

36 Claims, 7 Drawing Sheets

METHOD FOR DEFENDING AGAINST DENIAL-OF-SERVICE ATTACK ON THE IPV6 NEIGHBOR CACHE

CROSS-REFERENCE TO RELATED APPLICATIONS

This application is a continuation of U.S. patent application Ser. No. 11/280,428, the entirety of which is hereby incorporated by reference.

TECHNICAL FIELD

The present invention relates in general to packet networks having nodes implementing Internet Protocol Version 6 (IPv6) and, in particular, to defenses against denial-of-service attacks against IPv6 nodes.

BACKGROUND OF THE INVENTION

A denial-of-service (DoS) attack is a cyber-assault against a computer, server, network node, LAN or other networked entity that seeks to limit or prevent access to the Internet by overwhelming it with an unmanageable flood of requests (e.g. for a webpage or online resource) or emails (causing the email system to overload). A potentially more pernicious variant of this attack is a distributed denial-of-service (DDoS) attack, where the attacker infects a multitude of computers on the Internet (using for example a worm, virus or Trojan) and then directs this illicitly recruited army of computers to bombard the target with data packets.

A denial-of-service attack ("DoS attack") against a IPv6 network node can exploit the IPv6 neighbor cache and its state machine by exhausting the cache's available resources. IPv6 is particular vulnerable because of the large number of potential entries in the neighbor cache and because the neighbor unreachability state machine is much more complex than the IPv4 ARP (Address Resolution Protocol).

FIG. 1 is a schematic depiction of the operation of a neighbor discovery finite state machine as used by an IPv6 node to resolve addresses for incoming packets.

As is known in the art, a common problem for Layer 3 (network) packet protocols is to translate a Layer 3 (L3) address into a Layer 2 (L2) address in order to send packets to neighboring nodes on a multiple-access network (e.g. an Ethernet LAN). For the sake of completeness, is recalled that seven layers are defined by the Open System Interconnection (OSI) model, namely Layer 1 (the physical layer), Layer 2 (the "media" layer or data link layer). Layer 3 (the network layer), Layer 4 (the transport layer), Layer 5 (the session layer), Layer 6 (the presentation layer), and Layer 7 (the application layer). The present invention is concerned with mapping between L3 and L2.

Just like IPv4, IPv6 uses a protocol and a cache to keep track of neighboring nodes' Layer 2 addresses. Whereas IPv4 uses the Address Resolution Protocol (ARP) and an ARP table for this purpose, IPv6 now implements a Neighbor Discovery Protocol (NDP) and a neighbor cache (NC) for this purpose. When NDP is used to resolve a neighbor's Layer 2 address, it performs "Neighbor Resolution". But NDP is also used to perform Duplicate Address Detection (DAD), Router Discovery (RD), Neighbor Unreachability Detection (NUD), and (Stateless) Auto-configuration. NUD requires NDP to implement a Finite State Machine and a state is commonly stored in the neighbor cache.

Being a "cache", the neighbor cache and ARP table are simply data structures that Maintain state about neighbors that are relevant at a particular point in time. Unnecessary data can be purged at any time and the resources held by the cache should be conserved as there may be a large number of neighbors.

The neighbor cache is maintained separately for each interface (although it is possible to have a plurality of neighbor caches for a given interface or to have a plurality of interfaces sharing one neighbor cache). IPv4 ARP tables are generally only applicable to broadcast media (e.g. Ethernets), but IPv6 NDP can be used on all media. In general, DAD should be performed, and NUD, RD, and auto-configuration may be useful too, even on non-multi-access networks.

The principles of operation of the Neighbor Discovery Finite State Machine (which are well known in the art) are illustrated in detail in FIG. 1 by way of background. In practice, as will be appreciated by those of ordinary skill in the art, some enhancements to the state machine shown in FIG. 1 might be necessary. For example, an entry can end up in STALE state forever if traffic is sent to a neighbor and then never again. Therefore, STALE entries should be cleaned out with a slow interval to conserve memory.

A denial-of-service attack against the neighbor cache (NC) of a network node (or end host or router) exploits a vulnerability in the NC in that the cache can fill up with potentially useless entries. This interrupts the target's connectivity with its neighbors. If the attack is successful in overwhelming the target, the consequences may have a ripple effect into the network at large, depending on the function that the targeted node was performing or the resources it was providing.

It should be noted that while the IPv6 standard does not require an implementation to use a neighbor cache internally per se, as long as the external behavior remains the same, the problem will still subsist since some type of state-full behavior is necessary to perform basic Neighbor Discovery functions.

In every software implementation, the amount of resources available for protocols is limited by the system's resources. Thus, each system has a fundamental limit to how many entries can be stored in a cache (mainly memory in this case) and the cache is always competing for resources with other parts of the system.

In every IP network, the theoretical limit to the cache can be determined by the size of the subnet. In IPv4, the size depends on the subnet mask. For example, a common IPv4/24 (class C) network has 256 possible addresses. In practice, the number of neighbors is smaller but one can easily see that an IPv4 ARP table is quite small. In comparison, a common IPv6 prefix is /64, which corresponds to $2^{64}$ or 18,446,744,073, 709,551,616 possible addresses per prefix assigned to an interface. A link-local prefix (fe80::/10 or longer) is always present (likely another $2^{64}$). Therefore, whereas IPv4 ARP cache sizes are easy to handle and may even be pre-allocated, IPv6 neighbor caches should be managed more carefully. Complexity is further increased because of the IPv6 neighbor unreachability state machine. Therefore, IPv6 is particularly vulnerable to DoS attacks because the IPv6 neighbor cache has so many potentially valid entries and because the neighbor unreachability state machine complex, i.e. much more complex than the IPv4 ARP.

As is known in the art, the DoS attack may be local, where the attacker is attached to the same link as the target, or remote, where the attacker is multiple hops away from the target. Local attacks are easier to perform, have more impact and are harder to defend against. However, the local subnet is usually easier to control, meaning that an attacker must gain access to resources closer to the target, e.g. by gaining access to a building, or by breaking into a local node and controlling it remotely. Remote attacks are therefore more attractive to an attacker because of the complexities involved in gaining access to local nodes and the risk in getting caught. More importantly though, a local attacker has many more and simpler options when intending to disrupt the local network's operation than flooding the neighbor cache. While the present invention is directed primarily to defending against remote attacks, the methods described herein can also be used to blunt the impact of certain types of local attacks.

The simplest imaginable remote attack exploits the fact that the cache competes for resources with other parts of the target system. By sending a carefully crafted packet that has a destination under a prefix of the target's attached links, the attacker can make the target allocate a Neighbor Cache entry and try to solicit the destination's Layer 2 address on that link. If the destination address has been assigned to a node on the link (a real destination), it will answer, and if it does not (a bogus destination), there will be no answer. In both cases there will be an entry allocated in the NC for a period of time for that destination. If the attacker repeats the procedure for other destinations the cache fill will grow. Eventually the Neighbor Cache exhausts all memory on the target so that the target is unable to perform its intended function.

FIG. 2 schematically depicts a typical denial-of-service attack launched over the Internet 10 to which a plurality of legitimate users 12 are connected. A LAN (local area network) 14 is connected to the Internet via a router 16 (with or without a firewall) to enable the legitimate users 12 to communicate with one or more real neighbors 18 connected to the LAN 14. In a denial-of-service attack, a remote attacker 20 connects to the Internet 10 and launches a flood of packets at the router 16. As will explained below, the packets either contain real destination addresses that correspond to one of the real neighbors 18 on the LAN, or alternatively they are non-existent addresses, i.e. "bogus neighbors" 22.

FIG. 2 shows how a remote attacker can fill up the neighbor cache of a router by sending packets to bogus destinations on the router's attached networks. It also shows a variation of the attack where the target instead is a host. In this case packets will be sent to the host with a source address which indicates that the packet came from a direct neighbor.

Further analysis of the Neighbor Discovery State Machine shows that when real destinations are used by the attacker, then the entries will start out as INCOMPLETE, then become REACHABLE once the real neighbor answers, whereas bogus destinations will just be INCOMPLETE for a while and then time out and be deleted. The default time-out for the INCOMPLETE state is one second times three retransmits.

The foregoing means that, for example, if the attackers send minimally sized IPv6 packets (40 Bytes, just the IPv6 header plus 14B Ethernet header and 4B trailer) to random destinations on a 100 Mbps Ethernet link, it can, in theory, build up and sustain perhaps 645,000 bogus entries in the target's Neighbor Cache. In addition to that, an entry is logged for each of the real destinations it sends to.

The Neighbor Discovery standard prescribes that nodes must retain a small packet queue (of at least one packet) for each neighbor entry awaiting neighbor resolution. Given that each entry contains at least one IPv6 packet, one IPv6 address, one MAC address, and a state, this puts memory usage up in the range of 40MB in this example.

Of course, this simple calculation assumes that all traffic out one interface is generated by the attacker, which will not be the case in practice. But this illustrates the scale of the problems an attacker can cause on one interface. An attack on many interfaces that is paired with distributed attackers will be manifold worse.

As will be appreciated, the effect of a denial-of-service attack depends on the target system implementation and could, in some cases, prevent the target from functioning properly due to memory exhaustion.

Accordingly, it would be highly desirable to provide a method of defending against a denial-of-service attack targeting an IPv6 Neighbor Cache.

SUMMARY OF THE INVENTION

An object of the present invention is to provide a method for defending against a denial-of-service attack on an IPv6 neighbor cache. This method protects the targeted node from being overwhelmed by the incoming packets and thus preserves minimal connectivity and functionality for the node in face of the attack. In general, as will be elaborated below, the method triggers stateless neighbor resolution when the number of neighbor cache entries in the neighbor cache exceeds a threshold that is either preset in a node's IPv6 neighbor cache policy or tuned by the network manager. The method can also trigger other defensive responses upon attainment of other thresholds, such as, but not limited to, shortening the incomplete-status timer, curtailing the number of retransmissions of neighbor solicitations, prioritizing entries, purging neighbor cache entries designated as incomplete, and stopping the queuing of packets.

Thus, an aspect of the present invention provides a method of defending against a denial-of-service attack on an IPv6 neighbor cache. The method includes the steps of determining a number of neighbor cache entries currently stored in the neighbor cache; determining whether the number of entries exceeds a neighbor cache threshold that is less than a neighbor cache limit defining a maximum capacity of the neighbor cache; and initiating stateless neighbor resolution when the number of entries in the neighbor cache exceeds the neighbor cache threshold, wherein stateless neighbor resolution includes sending a neighbor solicitation to resolve an address for an incoming packet without logging a corresponding entry in the neighbor cache.

In one embodiment, the method further includes a step of shortening the incomplete-status timer whereby an entry having a status designated as incomplete times out in less than 3 seconds.

In another embodiment, the method further includes a step of reducing to less than 3 a number of retransmissions of the neighbor solicitations that are retried before timing out.

In yet another embodiment, the method further includes a step of prioritizing neighbor cache entries according to a prioritization list which gives highest priority to packets from trusted sources and which gives least priority to neighbor cache entries designated as incomplete.

In a further embodiment, the further includes a step of purging neighbor cache entries designated as incomplete when the number of neighbor cache entries reaches a second threshold that is higher than the neighbor cache threshold that triggers stateless neighbor resolution but is less than the neighbor cache limit.

In still a further embodiment, the method further includes a step of deactivating the stateless neighbor resolution when the number of neighbor cache entries in the neighbor cache falls beneath a shut-off threshold.

Another aspect of the present invention provides an IPv6 network node configured to resist a denial-of-service attack. The node includes an IPv6 neighbor cache for storing a plurality of neighbor cache entries describing a current state of each incoming data packet as a neighbor address is resolved for that data packet; and a cache manager for monitoring a number of neighbor cache entries currently stored in the neighbor cache and for triggering a denial-of-service defense when the number of neighbor cache entries exceeds a neighbor cache threshold set by a denial-of-service policy.

In one embodiment, the denial-of-service defense includes initiation of stateless neighbor resolution whereby a neighbor solicitation is sent to resolve an address for an incoming packet without logging a corresponding entry in the neighbor cache.

In another embodiment, the denial-of-service defense further includes purging neighbor cache entries according to a prioritization list based on a prioritization policy.

In yet another embodiment, the node has a plurality of interfaces and wherein the IPv6 neighbor cache stores neighbor cache entries for at least two of the interfaces.

In a further embodiment, the IPv6 neighbor cache is shared with at least one other node whereby the neighbor cache stores neighbor cache entries for at least two nodes.

In yet a further embodiment, the node includes at least one interface, each interface having at least one IPv6 neighbor cache.

In still a further embodiment, the includes at least one interface, each interface having a plurality of IPv6 neighbor caches.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In a preferred embodiment of the present invention, a method is provided for defending against a denial-of-service attack on an IPv6 neighbor cache. In general, and as will be elaborated below, the method includes the steps of determining a number of neighbor cache entries currently stored in the neighbor cache and then determining whether the number of entries exceeds a neighbor cache threshold. This threshold is set to be less than a neighbor cache limit defining a maximum capacity of the neighbor cache. When the number of entries in the neighbor cache exceeds the neighbor cache threshold, stateless neighbor resolution is initiated whereby neighbor solicitations are sent to resolve addresses for incoming packets without logging corresponding entries (e.g. INCOMPLETE entries) in the neighbor cache. A number of other defenses and responses can be used to supplement this basic defense mechanism.

Figure 1:
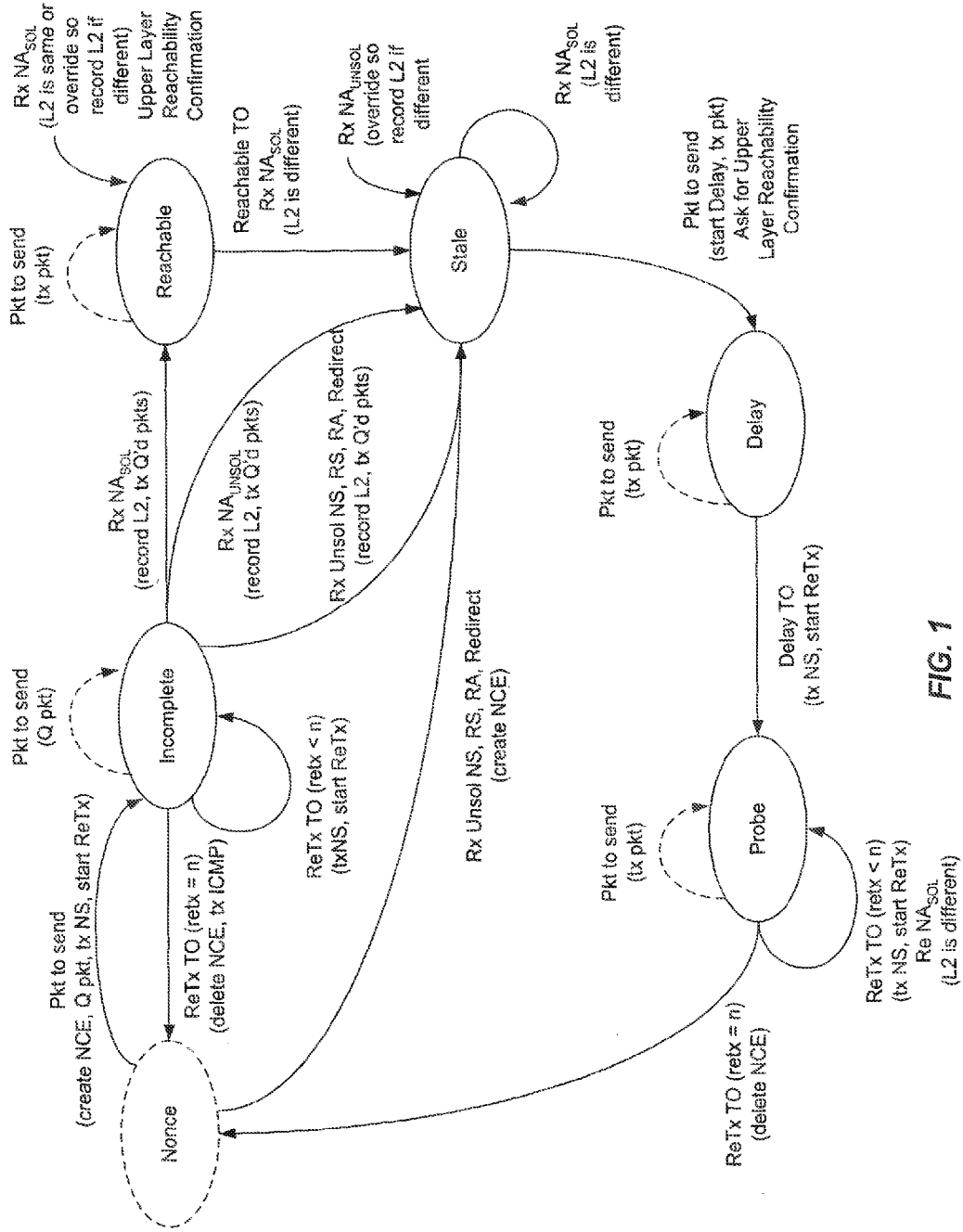
FIG. 1 is a schematic depiction of the operation of a neighbor discovery finite state machine as used by an IPv6 node to resolve addresses for incoming packets.
Figure 2:
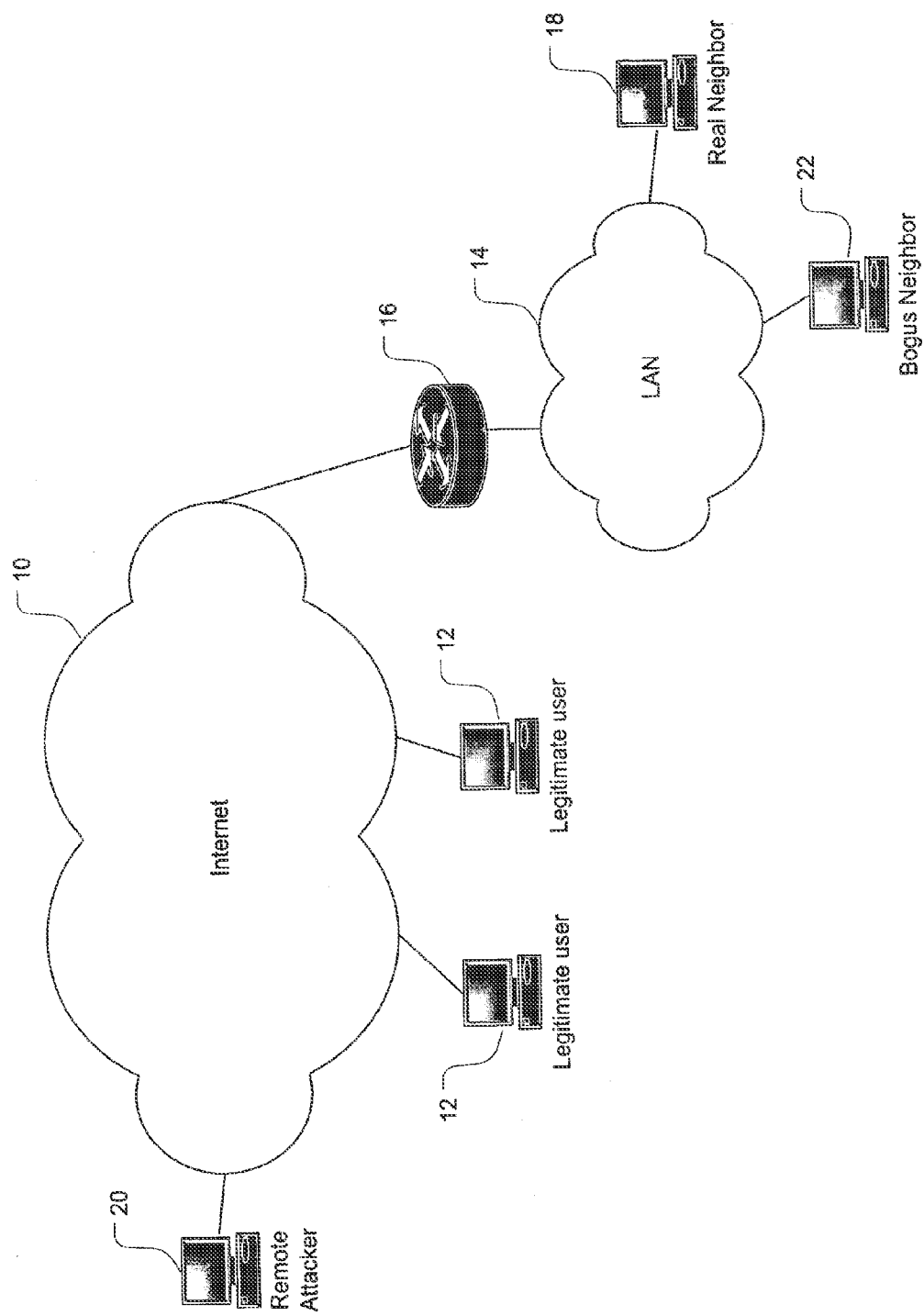
FIG. 2 is a schematic depiction of a denial-of-service attack.
Figure 3:
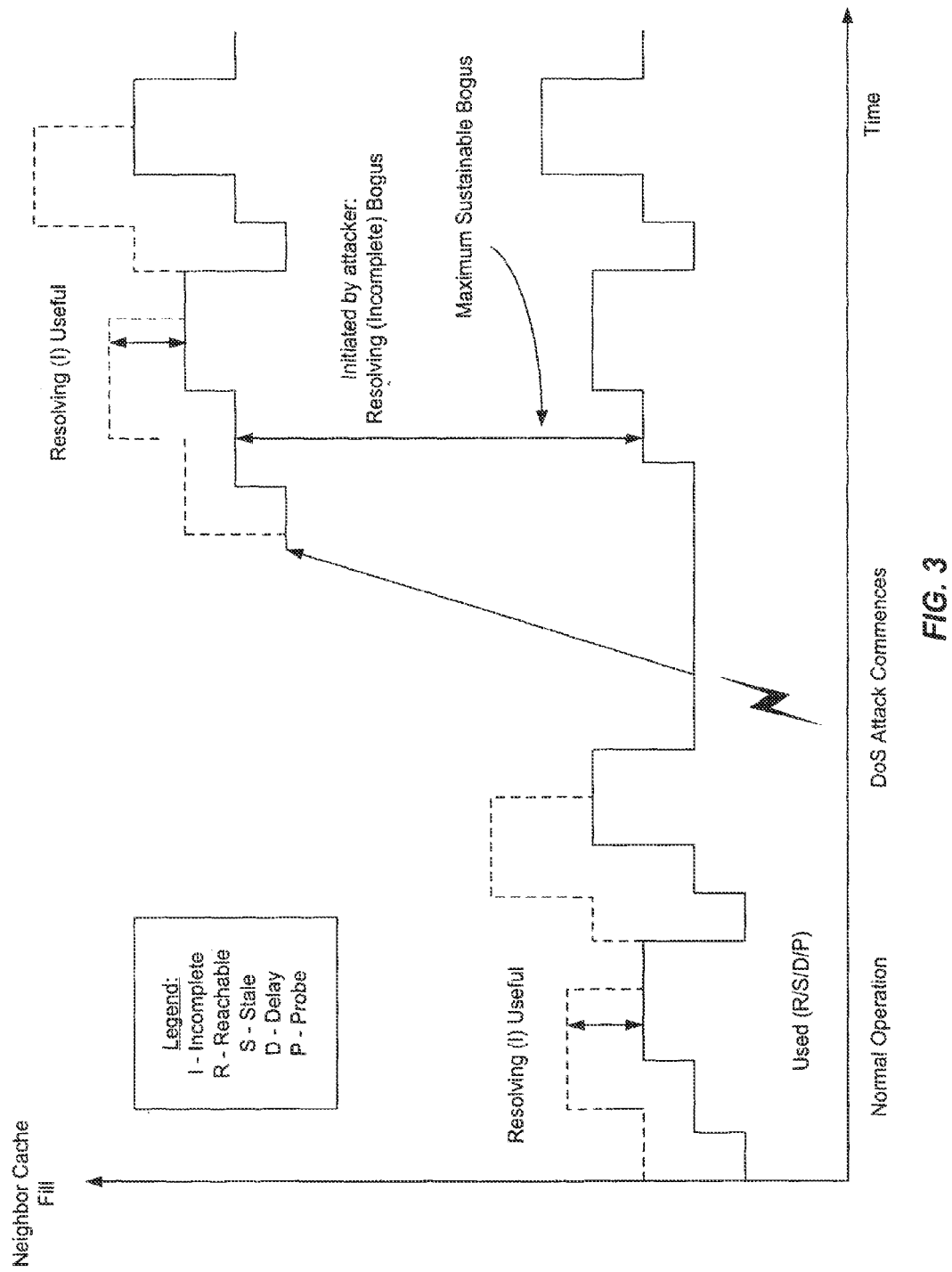
FIG. 3 is a graph of neighbor cache fill as a function of time both before and during a denial-of-service attack.

As shown in FIG. 3, when a denial-of-service attack is launched, the neighbor cache fill increases dramatically, Whereas the neighbor cache prior to the attack was only partially filled with a combination of REACHABLE (R), STALE (S), DELAY (D) and PROBE (P) entries plus a number of INCOMPLETE (I) entries, the DoS attack floods the neighbor cache with an overwhelming number of INCOMPLETE (I) entries.

Figure 4:
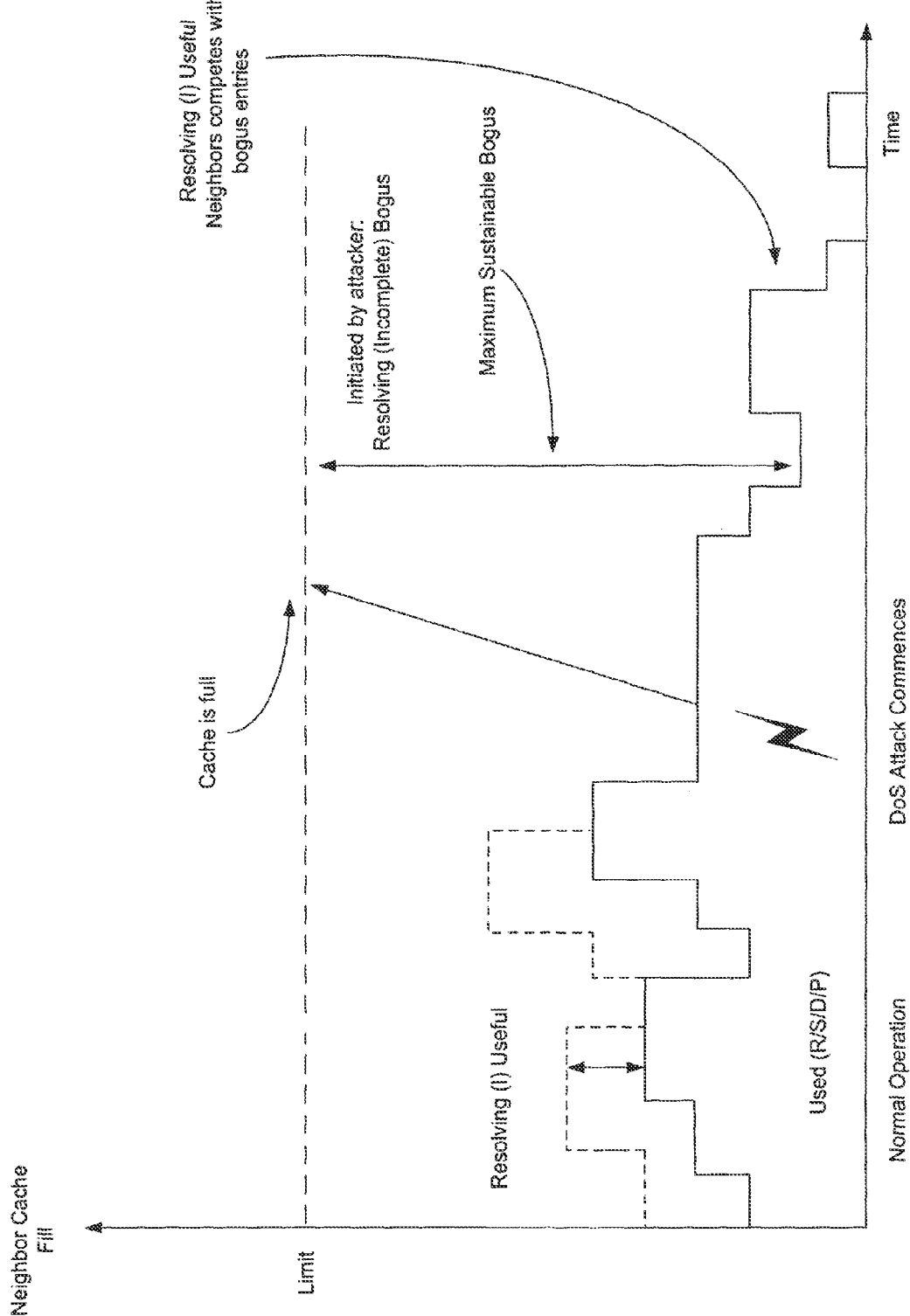
FIG. 4 is a graph of neighbor cache fill as a function of time, depicting the effect of neighbor cache limit during an attack.

As shown in FIG. 4, one remedy for a denial-of-service attack is to limit the resources available to the neighbor cache. Limiting the neighbor cache size, i.e. imposing a "neighbor cache limit" (the dashed line labeled "limit" in FIG. 4) will ensure that not all of the target node's resources are consumed by a DoS attack and that its other functions can continue to operate even under attack. But depending on how new requests to add entries into the cache are handled, an attacker may still be able to inhibit connectivity.

A simple size limit on the cache will merely deny all requests by the neighbor discovery protocol to add new entries into the cache when it has reached its limit and thus to drop the new incoming packets triggering these requests. In a typical DoS attack, if the cache limit is smaller than the total number of entries an attacker can sustain (i.e. the cache limit is hit), the cache fills up with INCOMPLETE entries as well as real entries that were present before the attack started. INCOMPLETE entries for real connections compete with the attacker's bogus entries. In general, the number of bogus INCOMPLETE entries are much larger than the number of real INCOMPLETE requests so connections can not be established to neighbors that were not in the cache when the attack started. If real entries in the cache are timed out, connectivity is lost until the attack subsides. On the other hand, if the cache limit is larger than the total number of entries the attacker can sustain (i.e. the cache limit is not hit), then the cache will function normally, albeit consuming unnecessary resources. However, a DoS attack is likely to sustain a very large number of entries, and therefore the latter scenario is more probable.

Another observation is that, if the neighbor cache limit is set to be smaller than the number of neighbors connected to a link, the node may experience problems similar to an attack under situations when it tries to communicate with many of them. The result is that a node cannot maintain connectivity with a greater number of neighbors (addresses) than its cache size limit permits.

It is clear that a solution to the neighbor cache DoS attack needs a more carefully devised algorithm to manage entries when the cache reaches its limit, that the limit must be carefully chosen, and that solutions (or "DoS defenses") must be able to cope with the cache limit being smaller than the number of neighbors on the link. These DoS defenses, while designed primarily to protect against remote DoS attacks, must also behave reasonably in the event of a local attack. For example, a local attacker can send fake router functions by sending Router Advertisements which entice hosts to try to connect to remote destinations through the fake router, or to auto-configure bad global addresses. Alternatively, a local attacker may steal addresses from its neighbors by sending Neighbor Advertisements (NA) with their target address and its own Layer 2 address. Alternatively, a local attacker may send a forged NA with solicited, override, and/or router flags set in order to control neighbor behavior. Furthermore, a local attacker could attempt to flood the neighbor cache (in the same way as the remote attacker could) but, in addition, could also fake lots of real neighbors by answering Neighbor Solicitations to destinations it uses to fill up the cache.

In light of the foregoing considerations, therefore, the method of defending against a denial-of-service attack on an IPv6 neighbor cache includes the following steps, which are preferably (but not necessarily performed by a cache manager): first the cache manager determines a number of neighbor cache entries currently stored in the neighbor cache. The cache manager then determines whether the number of entries exceeds a neighbor cache threshold. The neighbor cache threshold is less than a neighbor cache limit. The neighbor cache limit defines a maximum capacity of the neighbor cache. When the number of entries in the neighbor cache exceeds the neighbor cache threshold, the cache manager (or the neighbor cache itself) initiates stateless neighbor resolution. Stateless neighbor resolution entails sending a neighbor solicitation to resolve an address for an incoming packet without logging a corresponding entry in the neighbor cache. This enables neighbors to be solicited and resolved without clogging up the neighbor cache with INCOMPLETE entries.

The method in accordance with the preferred embodiment of the present invention therefore provides a simple and resilient solution against remote attacks while providing reasonable behavior during local attacks by intelligently managing the fill of the neighbor cache. This method provides a number of advantages and benefits, namely: that it minimizes packet drops to authentic neighbors to thus preserve connectivity to authentic neighbors; that it avoids expending valuable computational/processing and memory resources on attempting to resolve phony neighbor addresses; that it avoids starving other virtual routers (in the case of a router that implements virtual router functionality); that it avoids starving cache resources of other interfaces; that it avoids, starving particular neighbor addresses including phony addresses (since a phony address may become authentic after a neighbor assigns the address to its interface).

The above method can be refined by also introducing a neighbor cache limit (which is set on each interface). A coarsely grained limit, e.g. per system wide or virtual router, cannot be used because the interface/router may allocate lots of resources that other interfaces/routers are then prevented from using which makes problems overflow from one interface/router to another. A finely grained limit, e.g., per neighbor, cannot be implemented since this requires a priori knowledge of the neighbors and the whole point of Neighbor Discovery Protocol is to enable a router to dynamically discover its neighbors.

As was noted earlier, when the neighbor cache is unlimited, the DoS attack will cause the target to allocate lots of useless memory to caching entries. To maximize the devastating effect of this type of attack, the attacker would send a flood of small packets. As we have seen, the remedy is to limit the cache size by imposing a neighbor cache limit. However, where the cache size is limited, a different type of DoS attack becomes possible, namely one which seeks to hamper connectivity between the target and other adjacent nodes. To recap, therefore, there are thus two different forms of DoS attack, one that aims to hamper connectivity and the other that seeks to overwhelm the cache and thus to consume the target's memory. Consequently, the attacker's most efficient strategy for to force the target to over-allocate memory resources is to assail the target with large packets because these packets are queued on the neighbor entry. On the other hand, the attacker's most efficient strategy for hampering connectivity is to bombard the target with a flood of small packets.

The method in accordance with the preferred embodiment of the present invention provides a solution to both the connectivity attack and the memory exhaustion attack as both species of attack can be quelled by minimizing the number of useless entries.

One possibility is to only queue a few packets per interface. This has the obvious disadvantages that it is not RFC compliant and will probably mean more packet drop than queuing one packet per neighbor. An adaptive approach would thus be preferable to queue packets under certain conditions but not under other conditions, as will be elaborated below.

While removing STALE entries represents one way of alleviating pressure on the neighbor cache, the IPv6 standard dictates that entries stay in STALE until a packet is sent using that entry, then the entry is moved to DELAY for later reachability confirmation. The standard does not prescribe the period of time that the entry stays in STALE state so it is up to the implementation to clean out STALE entries as needed.

As introduced above, the method in accordance with the preferred embodiment of the present invention employs stateless neighbor resolution. Stateless neighbor resolution is an address resolution technique that does not create, log or otherwise register neighbor cache entries in the INCOMPLETE state. Stateless neighbor resolution prevents the neighbor cache from overloading or over because it simply does not fill up the neighbor cache with entries designated as INCOMPLETE. Since the DoS attack operates by filling up the neighbor cache with phony entries which are all in the INCOMPLETE state, stateless neighbor resolution prevents this from ever happening. With stateless neighbor resolution, when a packet is in need of L2 address resolution, the node will still send a Neighbor Solicitation (NS) asking for the destination's L2 address mapping but it will not create the INCOMPLETE state in the neighbor cache. If the packet is sent to a bogus neighbor, there will simply be no answer, and no harm is done since it was bogus. If the packet is sent to a real neighbor, there will instead be a Neighbor Advertisement (NA) answer in response to the NS and a Neighbor Cache entry (NCE) can then be created from the information in this packet.

Since there is no guarantee that reachability has actually been confirmed when the NA arrives, the new NCE should logically be created in the STALE state (even though the NA will have the Solicited Flag set). This will trigger a probe of the neighbor later on, if traffic to this neighbor continues, as the entry moves via DELAY to PROBE and reachability will then be confirmed. The consequence is that the probe will happen too early compared to RFC standards, but after this initial exchange, it will return to normal and thus be RFC-compliant thereafter. Alternatively, new entries can be created directly in the REACHABLE state. As is known by those of ordinary skill in the art, neighbor discovery protocols for IPv6 are described by various RFCs (Request for Comments), notably RFC 2461, RFC 3756, and RFC 1970.

A further consequence of removing the INCOMPLETE state is the number of retries for an unresolved neighbor becomes limited to one. Time-outs to retry the neighbor cannot be implemented since this cannot be done stateless. This will possibly be undesirable on media with lots of packet loss. However, Upper Layer Protocols (ULPs) usually time out or retry, which will thus partly mitigate the problem, as will be appreciated by those of ordinary skill in the art.

Also, when new packets to the same neighbor arrive before the first NS was answered, a new NS is sent out since there is no state to say that there is an outstanding NS. There will thus be a one-to-one correspondence between new packets and Neighbor Solicitations until the neighbor is resolved. Accordingly, in certain circumstances, plenty of unnecessary Neighbor Solicitations may be sent out.

Stateless neighbor resolution will prevent the neighbor cache from quickly filling up with lots of bogus entries. However, certain drawbacks should be borne in mind, namely: that stateless neighbor resolution is not RFC-compliant (i.e. either new neighbors are not created in REACHABLE state or too many or too few Neighbor Solicitations are sent when resolving the neighbor); that it does not cope well when the cache limit is smaller than the number of possible real neighbors on the link; and that no packets are queued on neighbor entries while awaiting neighbor resolution.

In the preferred embodiment, the method further includes a step of shortening the INCOMPLETE timer and/or making the number of retries smaller than three. By curtailing the INCOMPLETE timer, the maximum number of entries an attacker can sustain in the cache is diminished in a manner that is linearly proportional to the relative shortening of the timer. Similarly, by reducing the number of retransmissions or "retries" of Neighbor Solicitations while in the INCOMPLETE state, the effect of a DoS attack is reduced. However, to be RFC-compliant, this must be applied to the PROBE state as well. Again, one drawback that must be borne in mind is that the solution will not be RFC-compliant. Another drawback is that this solution might not be possible on very slow links.

In the preferred embodiment, the method further includes a step presetting a reserved entry in the neighbor cache that is reserved for dynamic discovery of Layer 3 to Layer 2 address mapping. Alternatively or additionally, in the preferred embodiment, the method can further include a step of presetting a static entry in the neighbor cache that provides a static Layer 3 to Layer 2 address mapping. A static neighbor entry ensures that a minimal degree of connectivity will always be available. While static entries may not be desirable in all situations, these are can be used with filters "in the field" when mending an on-going DoS attack.

A reserved entry is reserved in the cache (without it being a static L3 to L2 address mapping) so that the entry can be used to dynamically discover changes in the L2 address as well as for Neighbor Unreachability Detection. A DOS attack cannot affect connectivity to the address of the reserved entry.

In the preferred embodiment, the method can further include a step of prioritizing neighbor cache entries according to a prioritization list which gives highest priority to packets from trusted sources and which gives least priority to neighbor cache entries designated as incomplete. Alternatively, the prioritization list can be based on a prioritization policy set and controlled by a user (network manager).

For example, Secure Neighbor Discovery (SEND) is believed to guarantee that addresses cannot be stolen. It is also used to authorize routers so that nodes on the link can trust them. For the most part, this will not help alleviate the DoS attack. But it can be used to prioritize neighbor cache entries. Router Adverts using SEND to authorize the router can be trusted more than other entries. However, checksums have to be computed so the CPU of the node must be engineered to handle the full bandwidth of the interface.

An alternative approach is to prioritize the neighbor entries once the cache fills up. Attempts to add new entries to the neighbor cache are then allowed to push out old entries of lower priority. However, this approach requires a prioritization list or prioritization algorithm to determine priorities for all the entries in the cache.

In a network driven by Quality-of-Service (QoS), network traffic is given resources according to QoS parameters. These QoS parameter could also be used to prioritize neighbor cache entries. In Differentiated Services (DiffServ), the DiffSery Code Point (DSCP) in the IPv6 header could be used to prioritize the entries. The packets that trigger the creation of a neighbor cache entry could be used to give the entry an initial priority. For Integrated Services (IntServ), it would also be possible to derive priorities for neighbor cache entries. IntSery depends on allocation of resources in the network to support a particular service and neighbor cache entries could be part of that allocation.

Furthermore, a mechanism could penalize suspicious addresses that seem to have been used by a DoS attack. However, this blacklist of suspicious addresses would have to be maintained in some sort of state which also takes up memory and other resources on the system and potentially opens up avenues for new types of DoS attacks directed at this new data structure.

One alternative to using QoS to prioritize entries in the cache is to prioritize the entries according to their use, trustworthiness, or age. This may be useful when QoS is not implemented or when DSCP (Differentiated Services Code Point) cannot be trusted. If there is no policing function in the network between an attacker and the target, DSCP cannot be trusted because the attacker can form packets with a forged DSCP in what is known as a "theft of service" attack.

For example, a prioritization list (or prioritization policy) could be set as follows, from highest to lowest priority:
1. Give top priority to trusted routers that have been verified by SEND
2. Give next-highest priority to entries that Upper Layer Protocol (ULP) can verify
3. Prioritize route's next hop addresses
4. Prioritize Router Flagged Entries
5. REACHABLE entries
6. Override flag was set
7. Unsolicited Advertisements
8. DELAY and PROBE entries
9. STALE entries
10. INCOMPLETE entries A slight alteration to a policy like this would be to make a range of addresses, e.g. 3003::1/128 or 3003::/125 or 3003::1~3, exempt from prioritization and instead always be provided room in the cache. Conversely, a range of suspicious addresses could be down-prioritized or denied access to the cache.

Since it may prove to be relatively complex to implement a prioritized cache, e.g. keeping track of priorities and searching them etc., so therefore it may be preferable to adopt a simpler policy. For example, a simple policy would prioritize entries designated REACHABLE, STALE, DELAY and PROBE over entries designated as INCOMPLETE. By putting INCOMPLETE entries at the bottom of the list, this priority scheme avoids using resources on these entries. But it cannot help new connections being made during a DoS attack. Ultimately, local policy should determine how and when Neighbor Cache Entries should be prioritized. This may overcome the problem that new connections cannot be made during a DoS attack.

In the preferred embodiment, the method can also include a step of purging neighbor cache entries designated as incomplete when the number of neighbor cache entries reaches a second threshold that is higher than the neighbor cache threshold that triggers stateless neighbor resolution but is less than the neighbor cache limit. Alternatively, deletion/purging can be delayed until the cache is full, i.e. when the neighbor cache limit is hit.

Various strategies can be used to delete specific entries when the cache is overly congested. For example, when the cache limit is reached, the implementation can choose to schedule the STALE timer to clean up one or many NCEs that has been STALE for a long time. However, this will probably only temporarily alleviate the congestion as these STALE entries will then be replaced (almost immediately) with new INCOMPLETE entries injected by the attacker. In fact, if some of the STALE entries that were deleted are indeed of use for an authentic connection attempt just a short time after the congestion is detected, then the connection attempt is likely to fail.

Another approach is based on deleting INCOMPLETE states when the congestion occurs. Again, either all INCOMPLETE entries can be deleted, or INCOMPLETE entries can be replaced by new requests. Deleted entries will effectively be processed according to stateless neighbor resolution. Optionally, new requests to create INCOMPLETE entries can push out old INCOMPLETE entries. However, the main drawback of this approach is its implementation complexity. INCOMPLETE entries will have to be maintained separately or tracked so that replace operations are not too costly.

Figure 5:
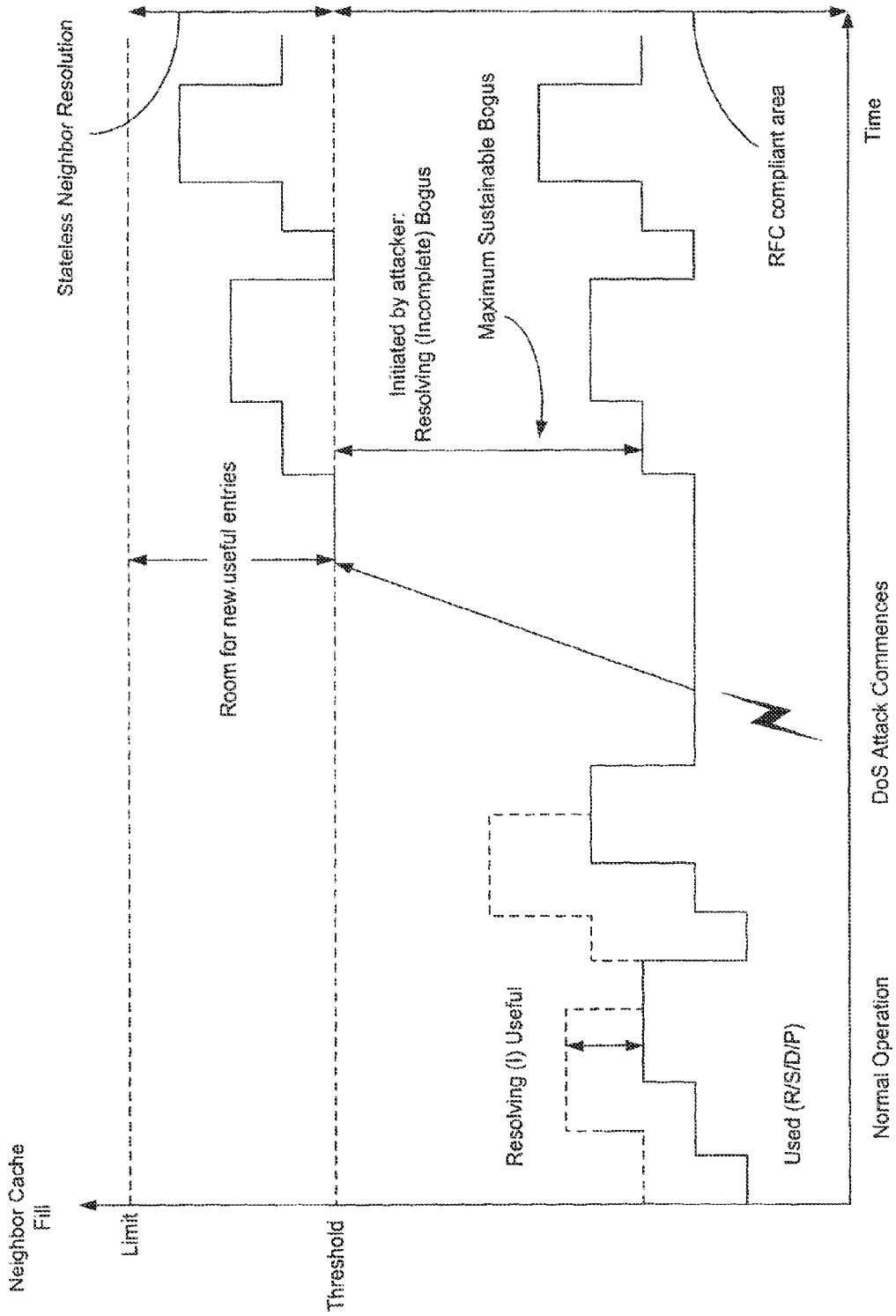
FIG. 5 is a graph of neighbor cache fill as a function of time, depicting operation of a method of defending against a denial-of-service attack on an IPv6 neighbor cache in accordance with an embodiment of the present invention.

FIG. 5 is a graph of neighbor cache fill as a function of time, depicting operation of a method of defending against a denial-of-service attack on an IPv6 neighbor cache in accordance with an embodiment of the present invention. As shown in FIG. 5, the method according to the preferred embodiment of the present invention adapts to the node's current circumstances by operating in a manner that is RFC-compliant during normal usage and then, if under DoS attack, shifting into a regime of stateless neighbor resolution (which is not RFC-compliant) until the attack subsides, at which point the node returns to normal operation.

As shown in FIG. 5, stateless neighbor resolution is triggered on reaching (or alternatively on exceeding) a neighbor cache threshold (i.e. a "first threshold") that is preferably set to a value less than the neighbor cache limit. It will be appreciated, however, that the threshold could be made equal to the limit (which effectively dispenses with the neighbor cache threshold altogether whereby stateless neighbor resolution is triggered on reaching the neighbor cache limit). Applying stateless neighbor resolution only when the cache has reached its limit (and new additions to it are rejected) will result in neighbor discovery being fully functional and RFC-compliant until the cache reaches its limit; however, this will merely move the problem of cache entry creation to when the NA arrives. Under an attack, the entry creation will be denied at this time. Hence, stateless neighbor resolution should preferably be initiated before the neighbor cache limit is hit, i.e. a neighbor cache threshold should be set to a value that is less than the neighbor cache limit.

Preferably, the neighbor cache threshold is set as a percentage of the neighbor cache limit, or alternatively as a number of entries less than the limit. This ensures that stateless neighbor resolution is triggered well before the limit is reached. Accordingly, neighbor discovery will function normally until the threshold is reached, and then stateless neighbor resolution (or "stateless neighbor discovery") will be triggered to prevent the neighbor cache from filling up its last precious free space with INCOMPLETE entries (bogus or not). This will guarantee that a number of authentic new connections will be able to use stateless neighbor resolution to gain access to the neighbor cache, whereas an attacker's bogus entries will never completely fill the cache.

As shown in FIG. 5, there is room between the threshold and the limit for creating cache entries that can be reserved to states other than INCOMPLETE. New entries would then always be created in REACHABLE or STALE states according to the neighbor unreachability finite state machine. Under an attack where the attacker can sustain a total number of entries larger than the threshold, this solution prevents the attacker from injecting more INCOMPLETE states beyond the threshold, thereby diminishing the effect of the attack. New connections are always granted given that the room between the threshold and the limit is not filled up, and such new entries will push out INCOMPLETE entries that fail by not getting answered (bogus entries created by the attacker). Since INCOMPLETE states exist for three seconds (according to RFC), in theory there is always room to create a number of entries equal to the difference between the limit and the threshold in an interval of 3 seconds. For example, if the limit is set to 3000 and the threshold to half of that (1500), then there will always be resources available for 500 new authentic connections per second barring any limiting link transmission rate.

In the preferred embodiment, the method further includes a step of deactivating stateless neighbor resolution when the number of neighbor cache entries in the neighbor cache falls beneath a shut-off threshold, at which point the node returns to the RFC-compliant, normal status of creating entries in the cache as neighbor addresses are resolved. The first threshold (i.e. the neighbor cache threshold that triggers stateless neighbor resolution) could be the same as the threshold for turning off stateless neighbor resolution (the shut-off threshold). Preferably, however, the shut-off threshold is lower than the first threshold to ensure that once an attack is launched against a targeted node, the node remains in a state of heightened vigilance until the attack has truly subsided.

Figure 6:
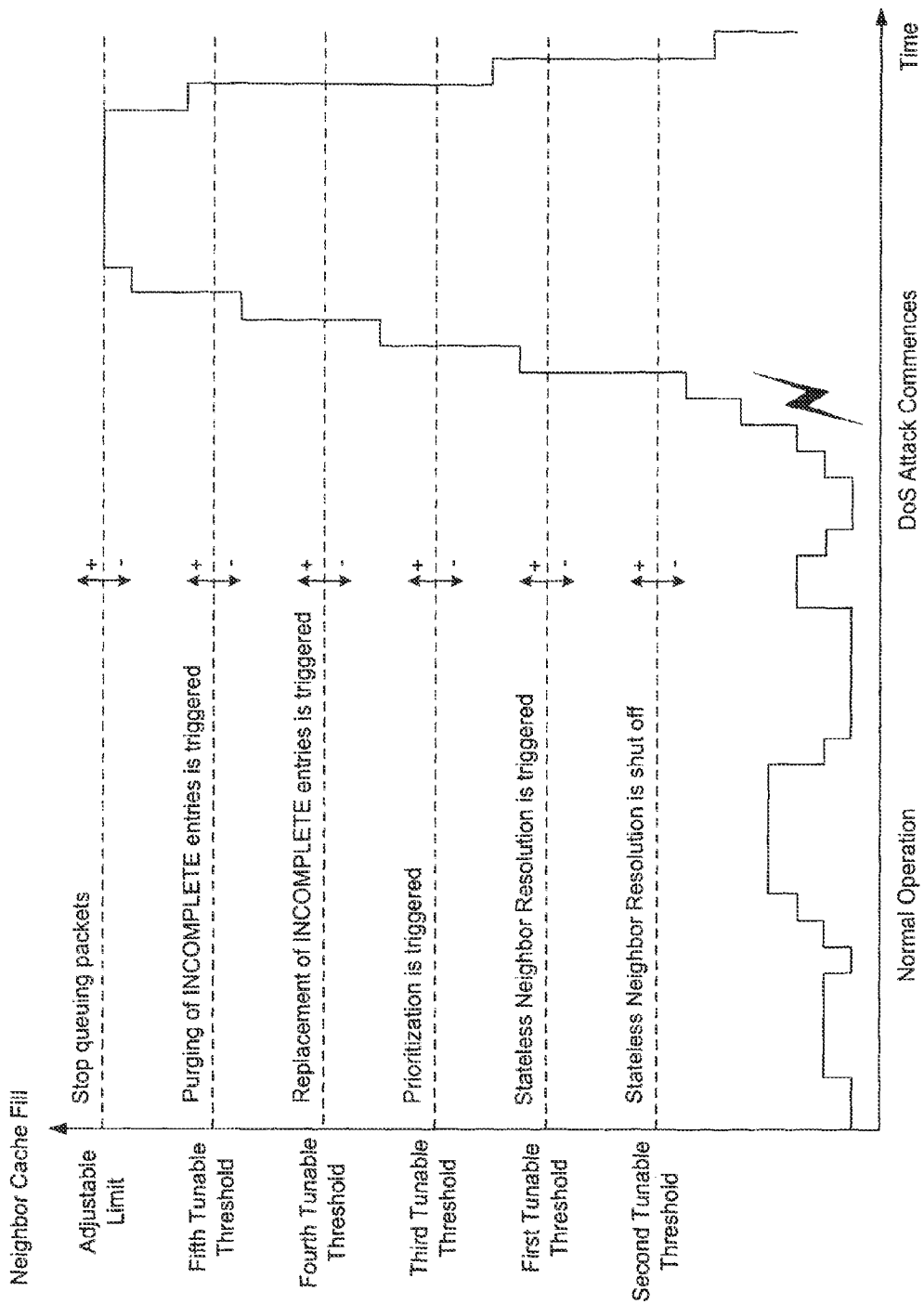
FIG. 6 is a graph of neighbor cache fill as a function of time, depicting the use of multiple, tiered and tunable thresholds in accordance with another embodiment of the present invention.

As illustrated in FIG. 6, multiple, "tiered" thresholds can be provided to trigger different responses or defenses at different levels of cache fill. As depicted in FIG. 6, five distinct, tunable thresholds and an adjustable limit are provided in one particular example, although it should of course be appreciated that the number of thresholds and the specific defenses that the thresholds trigger are illustrative only. In this example, the first and second thresholds trigger activation of the stateless neighbor resolution and its shut-off, respectively. A third threshold triggers prioritization. A fourth threshold triggers replacement of INCOMPLETE entries. A fifth threshold triggers purging of INCOMPLETE entries. Reaching the limit triggers stopping of packet queuing. These thresholds and their defenses are merely illustrative, and many combinations and variations are of course possible.

Preferably, each threshold is tunable or adjustable over a prescribed range determined by the policy. The policy can be made to verify consistency of threshold settings so that each threshold's setting logically interacts with the other thresholds' settings to avoid inconsistencies. These thresholds and limits can be preset by a network-wide control policy and/or be tuned by a network manager during usage or even during an attack. Tuning can also be automated based on a detected or measured parameters and factors, such as factors in the IPv6 protocol or factors outside of the IPv6 protocol, e.g. system resource usage.

In another embodiment, fewer (say three) thresholds are implemented for greater simplicity of implementation. In this embodiment, the method includes a step of purging neighbor cache entries designated as incomplete when the number of neighbor cache entries reaches a second threshold that is higher than the neighbor cache threshold (i.e. the "first threshold") but is less than the neighbor cache limit. The method could further include a step of stopping the queuing of incoming packets when the number of neighbor cache entries reaches a third threshold that is higher than the second threshold but is less than the neighbor cache limit.

The neighbor cache limit should be carefully engineered to avoid cases when the limit is smaller than the number of neighbor connections a node might want to sustain. The neighbor cache limit therefore depends on how many neighbors there are on a link and how many addresses they have assigned to their interface to the link. A neighbor cache entry is needed for each neighbor address the node communicates with. Thus, the ideal neighbor cache limit is the number of cache entries needed to cache an entry for each neighbor's address, including all link-local addresses and global addresses. Therefore, the neighbor cache limit (NCL) should satisfy the condition that NCL≥N×NCON where NCON represents the number of neighbor connections for a given node, the neighbor connections including all N link-local addresses and global addresses. For example, if a link has 51 nodes, and each node has a link-local address as well as a global address, the cache should ideally be able to hold 100 entries (51 nodes–1 for the node itself)×N addresses where N=2 because in this example there is only a single link-local address and a single global address for each node.

In some cases, having a cache large enough to always be able to hold entries for all neighbors' addresses is not possible simply because of resource limits or other system constraints. In other cases there may be no a priori knowledge of the number of neighbors or addresses on the link so the operator/implementer must attempt to estimate the approximate number of neighbors.

As is known in the art, a Point-to-Point ("PtP") link only has two nodes attached to it. The two nodes will always have link-local addresses assigned to their interface to the link. Usually routers will not assign a global address to PtP interfaces but sometimes they will. Sometimes networks may be renumbered so there may be an extra address during the transition. Sometimes PtP links may be changed from one to another node. Thus, usually the maximum number of neighbors a neighbor cache on a PtP link needs is 6.

Multiple access media, e.g. Ethernets, may have hundreds, thousands or even more nodes attached to the same link. Because IPv6 will likely be implemented in networks that previously had IPv4, one can assume that the number of nodes per IPv6 subnet will likely be the same as the number of IPv6 nodes on an IPv6 link. So an old /24 IPv4 subnet that is transitioned to IPv6 may need 3×28=768 cache entries. Not all IPv4 subnets are /24. Some are much larger, so a good estimate of the general multiple access media links would be typically around 3000.

However, not all nodes will need to keep all neighbors in their cache. Usually traffic patterns on a LAN involves the hosts accessing servers on remote LANs and thus only their default router needs to be kept in the cache. Devices with small memory that also follow this traffic pattern may therefore only want as many as entries in the cache.

In addition to engineering the neighbor cache limit, it is also important to properly engineer the neighbor cache threshold, i.e. the threshold at which stateless neighbor resolution is triggered. A neighbor cache threshold that is one entry less than the neighbor cache limit will always guarantee that new connections can be made but it will probably only be able to cope with a very small rate of new connections. As discussed above, the worst case authentic new connection rate can be calculated.

In general, the neighbor cache threshold, just like the neighbor cache limit, should be tunable (i.e. adjustable or configurable). The neighbor cache threshold can be tunable/adjustable as a percentage of the neighbor cache limit or as a number of entries below the neighbor cache limit. Preferably, neighbor cache threshold is set to a value to 40-60% of the neighbor cache limit, and more preferably to about 50% although this can vary according to policy.

Figure 7:
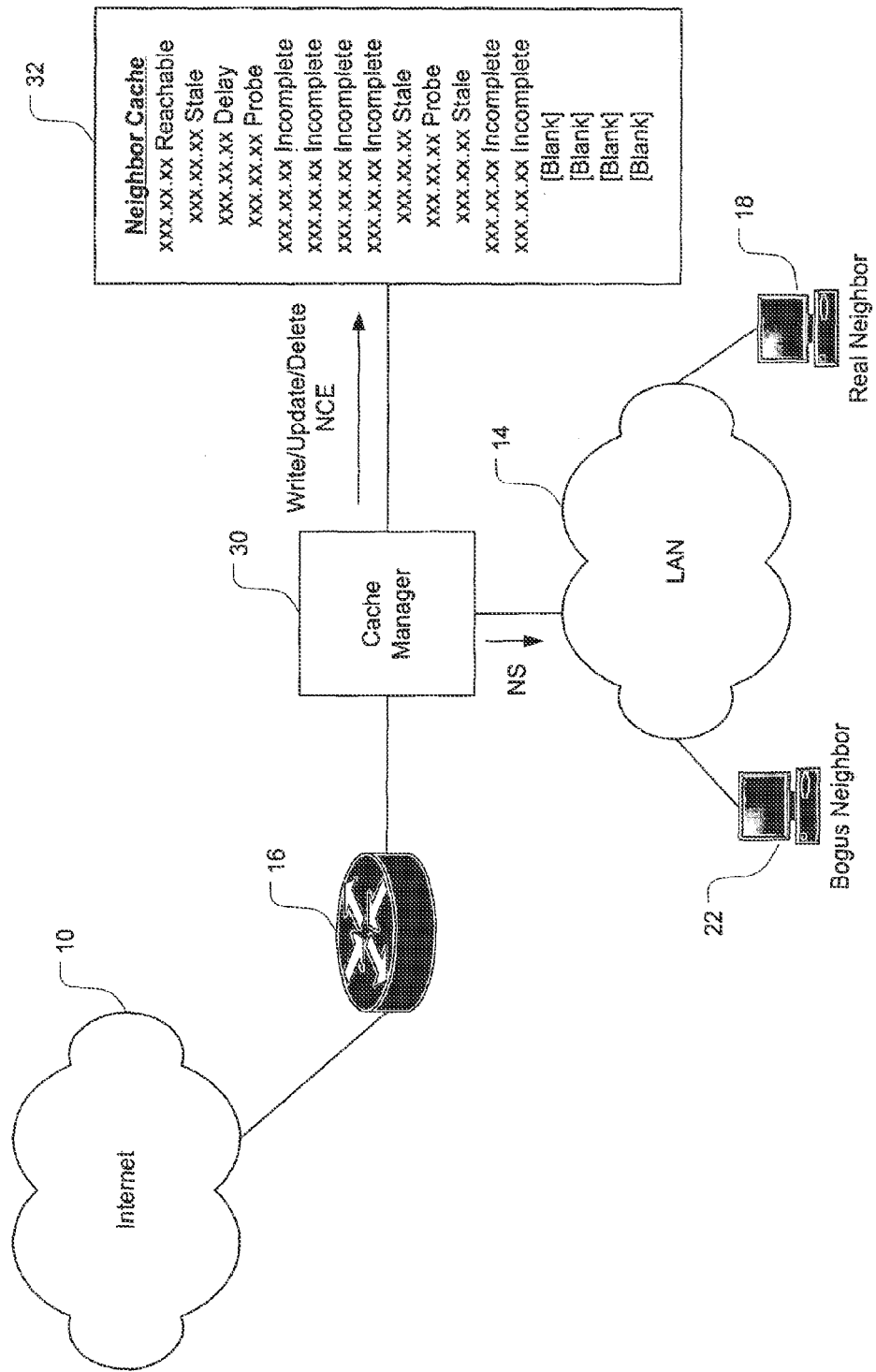
FIG. 7 is a schematic depiction of an IPv6 network node configured with a cache manager for resisting a denial-of-service attack in accordance with a preferred embodiment of the present invention.

FIG. 7 is a schematic depiction of an IPv6 network node configured with a cache manager 30 for resisting a denial-of-service attack in accordance with a preferred embodiment of the present invention. As depicted, the cache manager 30 is functionally interposed between the router 16 (which is connected to the Internet 10), the LAN 14 and the neighbor cache 32. When packets needing address resolution arrive at the router 16, the cache manager 30 writes or logs a neighbor cache entry (NCE) in the neighbor cache 32 (usually as INCOMPLETE initially) and sends a neighbor solicitation (NS) into the LAN 14. Depending on the response from the LAN, the cache manager 30 will possibly update the NCE (changing the state to DELAY, STALE, PROBE or REACHABLE) and will eventually delete an NCE designated as STALE after a prescribed period of time.

In the preferred embodiment, the cache manager 30 adaptively manages and controls the neighbor cache 32 by implementing an Adaptive Neighbor Cache Control Policy. In other words, the cache manager 30 monitors the neighbor cache 32 and triggers various denial-of-service defenses and responses when the number of entries in the neighbor cache 32 exceeds one or more of the thresholds set by the policy. As was discussed above, multiple thresholds may be used to trigger different denial-of-service defenses, depending on the perceived severity of the attack. For example, to partially recap the foregoing paragraphs, when the cache reaches a threshold, a policy may dictate that stateless neighbor resolution should be used, or that the STALE timer should be run, or that the STALE timer should not be run again until the cache is under the same (or a different) shut-off threshold, or that no further packets are to be queued, or combinations thereof. Similarly, when the cache reaches its limit, the policy could dictate other actions, such as deleting or purging entries in the cache, replacing entries, or prioritizing entries according to Quality-of-Service (QoS).

For the purposes of this specification, a denial-of-service (DoS) attack includes a distributed denial-of-service (DDoS) attack and therefore, for the sake of simplicity, both types of attack are generically referred to herein as a denial-of-service attack or a DoS attack.

In addition to using thresholds as the triggers for various defense mechanisms, the cache manager could also monitor changes in the rate of change of the neighbor cache fill to detect the sudden onslaught of a denial-of-service attack. The cache manager could also trigger defenses based on suspicious patterns in the timing of the incoming packets, e.g. their regularity, time-of-day, etc.

Although the foregoing description has been based upon the assumption that there is one instance of the neighbor cache per interface, which is consistent with IPv6 standards, it should be understood that it is possible to split up the neighbor cache so that there are multiple tables per interface. For example, all INCOMPLETE entries could be logged in one table while all other neighbor entries could be logged in a different table. When the first table becomes full, or exceeds a predetermined threshold, stateless neighbor resolution would be triggered. Alternatively, it is also possible to implement table-sharing whereby one neighbor cache (table) is shared by more than one interface.

Although the embodiments of the present invention that are described herein pertain to IPv6 nodes having IPv6 neighbor caches, it should be expressly understood that the expressions "neighbor cache" and "network node" are not to be limited solely to IPv6 but also to any further evolutions of Internet Protocol where a neighbor cache (or equivalent) is used to resolve addresses for incoming packets.

The embodiments of the invention described above are intended to be exemplary only. The scope of the invention is therefore intended to be limited solely by the appended claims.

The invention claimed is:

1. A non-transitory storage medium storing instructions for execution by at least one processor to defend against a denial of service attack in a computer network, the instructions comprising instructions executable by the at least one processor:
to determine a number of neighbor cache entries currently stored in a neighbor cache;
to determine whether the number of entries exceeds a neighbor cache threshold; and
to initiate stateless neighbor resolution when the number of entries in the neighbor cache exceeds the neighbor cache threshold, the stateless neighbor resolution including sending a neighbor solicitation to resolve an address for an incoming packet.

2. The storage medium of claim 1, wherein the neighbor cache threshold is less than a neighbor cache limit defining a maximum capacity of the neighbor cache.

3. The storage medium of claim 1, wherein the instructions further comprise instructions to send a neighbor solicitation to resolve an address for an incoming packet without logging a corresponding entry in the neighbor cache.

4. The storage medium of claim 1, wherein the neighbor cache is an Ipv6 neighbor cache.

5. The storage medium of claim 1, wherein the instructions further comprise instructions executable to adjust the neighbor cache threshold, 6. The storage medium of claim 2, wherein the instructions further comprise instructions executable to adjust the neighbor cache limit.

7. The storage medium of claim 1, wherein the instructions further comprise instructions executable to preset a reserved entry in the neighbor cache that is reserved for dynamic discovery of Layer 3 to Layer 2 address mapping.

8. The storage medium of claim 1, wherein the instructions further comprise instructions executable to preset a static entry in the neighbor cache configured to provide a static Layer 3 to Layer 2 address mapping.

9. The storage medium of claim 1, wherein the instructions further comprise instructions executable to shorten an incomplete-status timer whereby an entry having a status designated as incomplete times out in less than 3 seconds.

10. The storage medium of claim 1, wherein the instructions further comprise instructions executable to reduce to less than 3 a number of retransmissions of the neighbor solicitations that are retried before timing out.

11. The storage medium of claim 1, wherein the instructions further comprise instructions executable to prioritize neighbor cache entries according to a prioritization list that gives highest priority to packets from trusted sources and which gives least priority to neighbor cache entries designated as incomplete.

12. The storage medium of claim 2, wherein the instructions further comprise instructions executable to purge neighbor cache entries designated as incomplete when the number of neighbor cache entries reaches a second threshold that is higher than the neighbor cache threshold that triggers stateless neighbor resolution but is less than the neighbor cache limit.

13. The storage medium of claim 1, herein the instructions further comprise instructions executable to deactivate the stateless neighbor resolution when the number of neighbor cache entries in the neighbor cache falls beneath a shut-off threshold.

14. The storage medium of claim 13, wherein the shut-off threshold is different from the threshold for initiating stateless neighbor resolution.

15. The storage medium of claim 14, wherein the shut-off threshold is lower than the threshold for initiating stateless neighbor resolution.

16. The storage medium of claim 12, wherein the instructions further comprise instructions executable to stop queuing of incoming packets when the number of neighbor cache entries reaches a third threshold that is higher than the second threshold but is less than the neighbor cache limit.

17. The storage medium of claim 2, wherein the neighbor cache limit (NCL) satisfies the condition that $NCL \geq N \times NCON$ where NCON represents a number of neighbor connections for a given node, the neighbor connections including all link-local addresses and all global addresses and N represents a number of addresses.

18. The storage medium of claim 5, wherein the neighbor cache threshold is tunable as a percentage of a neighbor cache limit defining a maximum capacity of the neighbor cache.

19. A method for use in a network node of a computer network to defend against a denial of service attack, the method comprising:
determining a number of neighbor cache entries currently stored in a neighbor cache;
determining whether the number of entries exceeds a neighbor cache threshold; and
initiating stateless neighbor resolution when the number of entries in the neighbor cache exceeds the neighbor cache threshold, the stateless neighbor resolution including sending a neighbor solicitation to resolve an address for an incoming packet.

20. The method of claim 19, further comprising:
adjusting the neighbor cache threshold.

21. The method of claim 20, wherein the neighbor cache threshold is tunable as a percentage of a neighbor cache limit defining a maximum capacity of the neighbor cache.

22. The method of claim 19, wherein the neighbor cache threshold is less than a neighbor cache limit defining a maximum capacity of the neighbor cache.

23. The method of claim 22, further comprising:
adjusting the neighbor cache threshold.

24. The method of claim 22, further comprising:
purging neighbor cache entries designated as incomplete when the number of neighbor cache entries reaches a second threshold that is higher than the neighbor cache threshold that triggers stateless neighbor resolution but is less than the neighbor cache limit.

25. The method of claim 24, further comprising:
stopping a queueing of incoming packets when the number of neighbor cache entries reaches a third threshold that is higher than the second threshold but is less than the neighbor cache limit.

26. The method of claim 22, wherein the neighbor cache limit (NCL) satisfies the condition that $NCL \geq N \times NCON$ where NCON represents a number of neighbor connections for a given node, the neighbor connections including all link-local addresses and all global addresses and N represents a number of addresses.

27. The method of claim 19, further comprising:
sending a neighbor solicitation to resolve an address for an incoming packet without logging a corresponding entry in the neighbor cache.

28. The method of claim 19, wherein the neighbor cache is an IPv6 neighbor cache.

29. The method of claim 19, further comprising:
presetting a reserved entry in the neighbor cache that is reserved for dynamic discovery of Layer 3 to Layer 2 address mapping.

30. The method of claim 19, further comprising:
presetting a static entry in the neighbor cache configured to provide a static Layer 3 to Layer 2 address mapping.

31. The method of claim 19, further comprising:
shortening an incomplete-status timer whereby an entry having a status designated as incomplete times out in less than 3 seconds.

32. The method of claim 19, further comprising:
reducing, to less than 3, a number of retransmissions of the neighbor solicitations that are retried before timing out.

33. The method of claim 19, further comprising:
prioritizing neighbor cache entries according to a prioritization list that gives highest priority to packets from trusted sources and that gives least priority to neighbor cache entries designated as incomplete.

34. The method of claim 19, further comprising:
deactivating the stateless neighbor resolution when the number of neighbor cache entries in the neighbor cache falls beneath a shut-off threshold.

35. The method of claim 34, wherein the shut-off threshold is different from the threshold for initiating stateless neighbor resolution.

36. The method of claim 35, wherein the shut-off threshold is lower than the threshold for initiating stateless neighbor resolution.

* * * * *